US006928645B2

United States Patent
Wang et al.

(10) Patent No.: US 6,928,645 B2
(45) Date of Patent: Aug. 9, 2005

(54) SOFTWARE-BASED SPECULATIVE PRE-COMPUTATION AND MULTITHREADING

(75) Inventors: Hong Wang, Fremont, CA (US); Jamison Collins, Los Gatos, CA (US); John P. Shen, San Jose, CA (US); Bryan Black, Austin, TX (US); Perry H. Wang, San Jose, CA (US); Edward T. Grochowski, San Jose, CA (US); Ralph M. King, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 803 days.

(21) Appl. No.: 09/823,674

(22) Filed: Mar. 30, 2001

(65) Prior Publication Data

US 2002/0144083 A1 Oct. 3, 2002

(51) Int. Cl.[7] .................................................. G06F 9/46
(52) U.S. Cl. ....................... 718/102; 718/100; 712/235; 712/233
(58) Field of Search ................................ 718/100–102; 712/233–240

(56) References Cited

U.S. PATENT DOCUMENTS 5,812,811 A * 9/1998 Dubey et al. ................ 712/216
5,867,704 A * 2/1999 Tanaka et al. .............. 718/105
5,913,925 A * 6/1999 Kahle et al. ................ 712/206
6,286,027 B1 * 9/2001 Dwyer et al. ............... 718/107
6,389,446 B1 * 5/2002 Torii ........................... 718/100
6,463,526 B1 * 10/2002 Chaudhry et al. .......... 712/228
6,539,541 B1 * 3/2003 Geva .......................... 717/150
6,574,725 B1 * 6/2003 Kranich et al. .............. 712/31
6,658,451 B1 * 12/2003 Chaudhry et al. .......... 718/108
6,665,791 B1 * 12/2003 Berenbaum et al. ......... 712/24
6,684,398 B2 * 1/2004 Chaudhry et al. .......... 718/106
6,732,363 B1 * 5/2004 Chaudhry et al. .......... 719/318
6,772,324 B2 * 8/2004 Akkary et al. .............. 712/235

OTHER PUBLICATIONS

Roth, Amir et al. "Speculative Data–Driven Multithreading." IEEE. Jan. 2001.*
Wallace, Steven et al. "Threaded Multiple Path Execution." IEEE. Jul. 1998.*
Krishnadas, K.C. "Multithreading spin offered for VLIW processors." Electronic Engineering Times, 2002.*

* cited by examiner

Primary Examiner—Lewis A. Bullock, Jr.
(74) Attorney, Agent, or Firm—Blakely, Sokoloff, Taylor & Zafman LLP

(57) ABSTRACT

Speculative pre-computation and multithreading (SP), allows a processor to use spare hardware contexts to spawn speculative threads to very effectively pre-fetch data well in advance of the main thread. The burden of spawning threads may fall on the main thread via basic triggers. The speculative threads may also spawn other speculative threads via chaining triggers.

16 Claims, 8 Drawing Sheets

```
arc = arcs + group_pos;
for ( ; arc < stop_arcs; arc += nr_group )
{
    if( arc ->ident > BASIC )
    {
        red_cost = arc->cost - arc->    tail->potential +
                   arc-> head->potential ;

if((red_cost < 0 && arc->ident == AT_LOWER) ||
           (red_cost > 0 && arc->ident == AT_UPPER))
        {
            basket_size++;
            perm[basket_size] ->a = arc;
            perm[basket_size]->cost = red_cost;
            perm[basket_size]->abs_cost = ABS(red_cost);
        }
    }
}
```

Delinquent Load 502

Delinquent Load 504
Delinquent Load 506

| | L1 Miss Rate / % Capacity Miss | L2 Miss Rate / % Capacity Miss | L3 Miss Rate / % Capacity Miss |
|---|---|---|---|
| DelinquentLoad 502 | 99.95% / 99.98% | 48.06% / 82.78% | 67.64% / 97.38% |
| DelinquentLoad 504 | 80.92% / 97.60% | 63.55% / 86.51% | 20.04% / 47.88% |
| DelinquentLoad 506 | 93.10% / 99.1% | 45.33% / 74.65% | 20.70% / 44.74% |

510

_US 6,928,645 B2_

SOFTWARE-BASED SPECULATIVE PRE-COMPUTATION AND MULTITHREADING

BACKGROUND OF THE INVENTION

1. Field of the Invention

The invention is related to computers and computer technology, and in particular, to architecture and microarchitecture.

2. Background Information

Memory latency still dominates the performance of many applications on modern processors, despite continued advances in caches and pre-fetching techniques. Memory latency, in fact, continues to worsen as central processing unit (CPU) clock speeds continue to advance more rapidly than memory access times and as the data working sets and complexity of typical applications increase.

One trend in modern microprocessors has been to reduce the effect of stalls caused by data cache misses by overlapping stalls in one program with the execution of useful instructions from other programs, using techniques such as Simultaneous Multithreading (SMT). SMT techniques can improve overall instruction throughput under a multiprogramming workload. However, SMT does not directly improve performance when only a single thread is executing.

Various research projects have considered leveraging idle multithreading hardware to improve single-thread performance. For example, speculative data driven multithreading (DDMT) has been proposed in which speculative threads execute on idle hardware thread contexts to pre-fetch for future memory accesses and predict future branch directions. DDMT focuses on performance in an out-of-order processor in which values are passed between threads via a monolithic 512-entry register file.

Another project studied the backward slices of performance degrading instructions. This work focused on characterizing sequences of instructions that precede hard-to-predict branches or cache misses and on exploring techniques to minimize the size of the backward slices.

Assisted Execution was proposed as a technique by which lightweight threads, known as nanothreads, share fetch and execution resources on a dynamically scheduled processor. However, nanothreads are subordinate and tightly coupled to the non-speculative thread, having only four registers of their own and sharing the program stack with the non-speculative thread.

Simultaneous Subordinate Micro-threading (SSMT) has been proposed in which sequences of micro-code are injected into the non-speculative thread when certain events occur. The primary focus of SSMT is to use micro-thread software to improve default hardware mechanisms, e.g., implementing alternative branch prediction algorithm targeting selected branches.

Dynamic Multithreading architecture (DMT) has been proposed, which aggressively breaks a program into threads at runtime to increase the instruction issue window. However, DMT focuses primarily on performance gains from increased tolerance to branch mis-predictions and instruction cache misses.

Others have proposed Slipstream Processors in which a non-speculative version of a program runs alongside a shortened, speculative version. Outcomes of certain instructions in the speculative version are passed to the non-speculative version, providing a speedup if the speculative outcome is correct. Slipstream Processors focuses on implementation on a chip-multiprocessor (CMP).

Threaded Multipath Execution (TME) attempts to reduce performance loss due to branch mis-predictions by forking speculative threads that execute both directions of a branch, when a hard to predict branch is encountered. Once the branch direction is known, the incorrect thread is killed.

There has been proposed pre-executing instructions under a cache miss. Under this technique, when the processor misses with a cache access, the processor would continue to execute instructions expecting useful pre-fetches to be generated by pre-executing these instructions. The instructions are re-executed after the data from the load returns.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which:

FIG. 5 depicts example source code for a key loop in a benchmark that contains three loads of interest;

DETAILED DESCRIPTION OF THE ILLUSTRATED EMBODIMENTS

Figure 1:
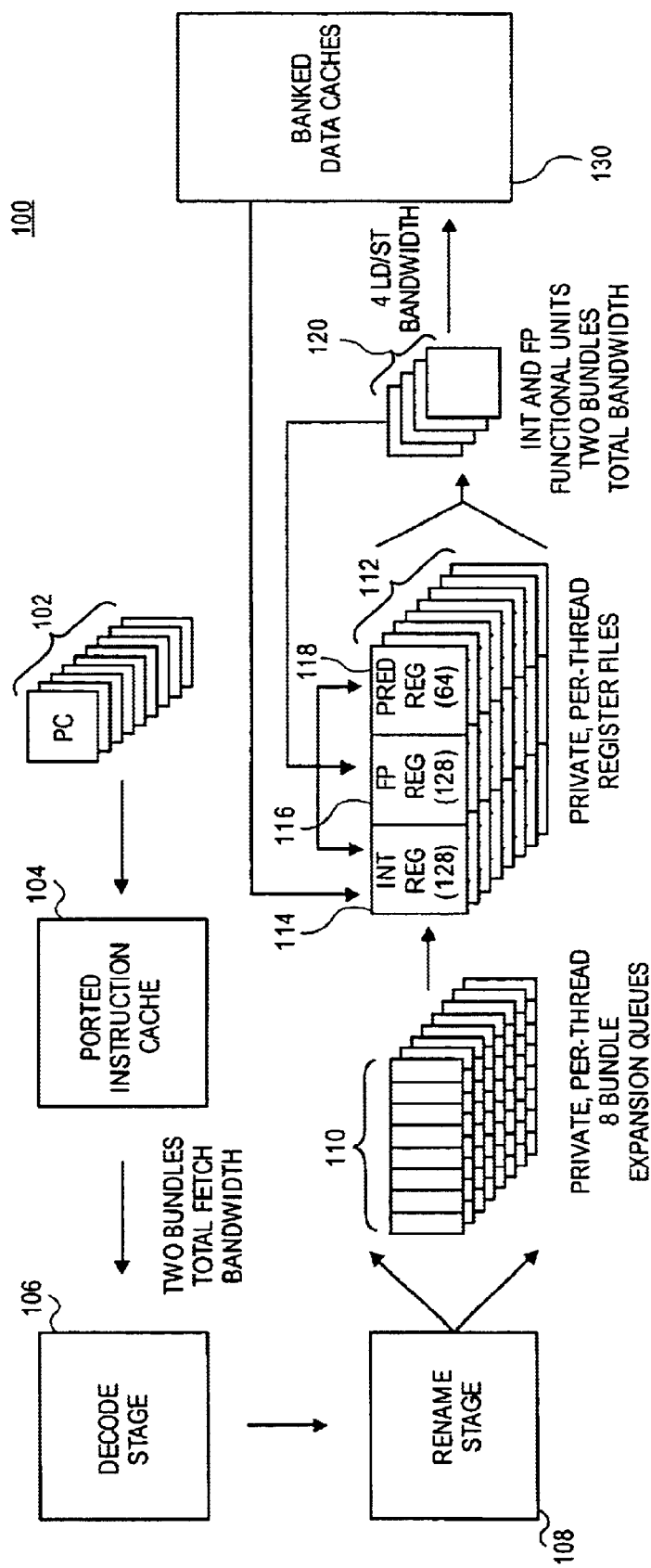
FIG. 1 depicts an exemplar pipeline organization for a processor with simultaneous multithreading support.

A system and corresponding methods to improve single thread performance in a multithreaded architecture are described in detail herein. In the following description, numerous specific details, such as particular processes, materials, devices, and so forth, are presented to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Some parts of the description will be presented using terms such as load, instruction, pipeline, cache memory, register files, program, and so forth. These terms are commonly employed by those skilled in the art to convey the substance of their work to others skilled in the art.

Other parts of the description will be presented in terms of operations performed by a computer system, using terms such as receiving, detecting, collecting, transmitting, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Various operations will be described as multiple discrete steps performed in turn in a manner that is most helpful in understanding the invention. However, the order in which they are described should not be construed to imply that these operations are necessarily order dependent or that the operations be performed in the order in which the steps are presented.

Reference throughout this specification to "one embodiment" or "an embodiment" means that a particular feature, structure, process, step, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention is directed to speculative pre-computation and/or speculative multithreading. In one embodiment, speculative pre-computation and multithreading is implemented on a simultaneous multithreaded (SMT) processor, however, the particular architecture or microarchitecture is not limiting factor. For example, speculative pre-computation and multithreading may be implemented on any computer architecture or microarchitecture that supports multiple threads on the same die. In other embodiments, speculative pre-computation and multithreading may be implemented on switch-on-event-multithreading (SOEMT) processors, multithreaded processors, or multiple-core-on-die- chip multiprocessors (CMP).

FIG. 1 depicts an exemplar pipeline organization for an exemplar processor 100 with simultaneous multithreading support. The pipeline represents the stages in which an instruction is moved through the processor 100, including its being fetched, perhaps buffered, and then executed. In one embodiment, the processor 100 is a processor in the Itanium family of processors available from Intel Corporation in Santa Clara, Calif., and implements the Itanium instruction set architecture. However, other processors may be used to implement speculative pre-computation and multithreading. The example pipeline shows an embodiment in which the processor 100 is an Itanium processor and in which the example pipeline includes a program counter (PC) 102, a ported instruction cache 104, a decode stage 106, a rename stage 108, expansion queues 110, register files 112, functional units 120, and banked data caches 130. Of course, data caches do not have to be banked and expansion queues may not be used.

The example PC 102 is intended to represent one or more program counters, which include the addresses of the next instruction to be fetched for each thread executing in the processor 100. Each thread has its own program counter. In one embodiment, eight different programs can be fetched into the pipeline. In this case, the PC 102 points to next address in program and brings the instruction into the pipeline. The PC 102 also may be referred to as an "instruction pointer."

In one embodiment, the processor 100 fetches instructions in units of bundles, rather than individual instructions. In one embodiment, each bundle is comprised of three instructions grouped together by the compiler (not shown). In this embodiment, the ported instruction cache 104 has two ports, receives two addresses, and two instructions or threads are fetched, one on each port. Of course, more or fewer than two instructions or threads can be fetched when the instruction cache has more or fewer ports.

In one embodiment, the decode stage 106 decodes the bundles and reads source operands. Also in this embodiment, the rename stage 108 renames the operands by mapping operands from virtual operands into physical operands.

In one embodiment, the expansion queues 110 queue up instructions. The expansion queues 110 may be private, per-thread eight-bundle expansion queues and include an expansion queue for each thread. In this embodiment, each expansion queue 110 has eight bundles. Of course, expansion queues can be other sizes.

Each thread has its own context of register files. In one embodiment, the register files 112 include three register files for each thread: an integer register file 114, a floating-point register file 116, and a predicate register file 118. The register files 112 also include source operands and destination operands. In general, an instruction describes an operation (e.g., add, subtract, multiply, divide) to be performed on data. The data on which the operation is to be performed is the "operand."

The operational code (opcode) specifies the operation to be performed on the operand. In one embodiment, the functional units 120 perform the operations. Also in this embodiment, the functional units 120 include integer functional units and floating-point functional units.

In one embodiment, once the functional units 120 perform operations on the data, the results may be written back into the register files 112 or may be sent to the banked data cache 130. If the computation is a "load"/"store," the "load"/"store" requests are sent to data cache. In this embodiment, the bandwidth is four "load"/"store" requests. In other embodiments, the bandwidth may be more or fewer than four "load"/"store" requests.

In one embodiment, instructions are issued in-order, from the expansion queues 110, which operate like in-order instruction queues. The execution bandwidth may be six instructions per cycle, which can be from up to two bundles. Any two issued bundles may be executed in parallel without functional unit contention and up to four "loads" or "stores" may be performed per cycle. Of course, in other embodiments, the pipeline may operate out-of-order.

In one embodiment, the memory hierarchy for the instruction cache 104 and data caches 130 may include separate 16K four-way set associative first level (L1) instruction and data caches, a 256K four-way set associative second level (L2) shared cache and a 3072K twelve-way set associative shared third level (L3) cache. All caches are on chip. The data caches 130 are multi-way banked, but the instruction cache 104 is ported, which may reduce fetch conflicts between threads. On processors with more than two thread contexts, a dual-ported instruction cache is assumed. Caches are non-blocking with up to sixteen misses in flight at once.

A miss upon reaching this limit stalls the execute stage. Speculative threads are permitted to issue "loads" that will stall the execute stage.

In one embodiment, a pipelined hardware translation look-aside buffer (TLB) miss handler (not shown) resolves TLB misses by fetching the TLB entry from an on-chip buffer (not shown and separate from data and instruction caches). In this embodiment, TLB misses may be handled in thirty clock cycles, and memory accesses from speculative threads may be allowed to affect the update of the TLB.

In one embodiment, the processor 100 has a clock rate of two gigahertz (GHz). Other embodiments may utilize higher or lower clock frequencies.

In one embodiment, a single main thread persistently occupies one hardware thread context throughout its execution while remaining hardware thread contexts may be either idle or occupied by speculative threads. Unless explicit distinction is made, the term "non-speculative thread" may be used interchangeably with the notation of the "main thread" throughout this description. Each hardware thread context has a private, per-thread expansion queue and register files.

In one embodiment, all architecturally visible registers, including the general-purpose integer registers 114, the floating-point registers 116, the predicate registers 118, and control registers, are replicated for each thread. In this embodiment, the general-purpose integer registers 114 typically provide sixty-four bit registers for integer and multimedia computation. The floating-point registers 116 typically provide eighty-two-bit registers for floating-point computations. The predicate registers 118 typically are one-bit registers that enable controlling the execution of instructions. In one embodiment, when the value of a predicate register is true, the instruction is executed.

If more than one thread is ready to fetch or execute, two threads are selected from those that are ready and each thread is given half of the resource bandwidth. Thus, if two threads are ready to fetch, each thread is allowed to fetch one bundle. In one embodiment, around-robin policy is used to prioritize the sharing between threads. In this embodiment, if only one thread is ready, the thread is allocated the entire bandwidth.

Also in this embodiment, if instructions stall before they reach the expansion queue 110, the stall will cause pipeline backpressure. To prevent a stalling thread from affecting all other threads, a fetch-replay is performed when a thread attempts to insert a bundle into its already full expansion queue 110. When this occurs, the bundle is dropped by the expansion queue 110 and the thread of concern is prevented from fetching again until the thread has issued an instruction.

Figure 2:
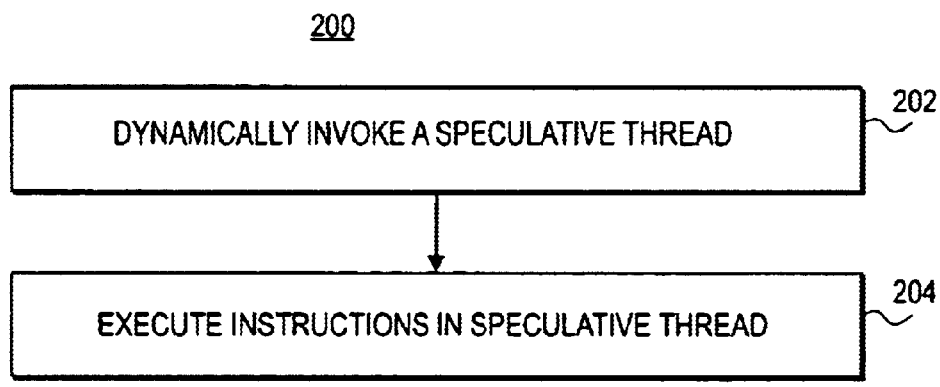
FIG. 2 is a flowchart illustrating an approach to software-based pre-computation and multithreading according to an embodiment of the present invention.

FIG. 2 is a flowchart 200 illustrating an approach to software-based pre-computation and multithreading according to an embodiment of the present invention. In step 202, a speculative thread is dynamically invoked. In step 204, the instructions in the speculative thread are executed. In one embodiment, an event triggers the invocation and execution of a pre-computation slice as a speculative thread that pre-computes the address accessed by a load of interest, which is expected to appear later in the instruction stream. A pre-computation-slice includes a sequence of dependent instructions that have been extracted from a main thread. Pre-computation slices compute the address to be accessed by a delinquent load. The speculatively executed pre-computation slice (or thread) thus effectively pre-fetches for the load of interest. Speculative threads may be spawned under one of two conditions: when encountering a basic trigger, which occurs when a designated instruction in the main thread is retired, or when encountering a chaining trigger, when one speculative thread explicitly spawns another speculative thread.

Figure 3:
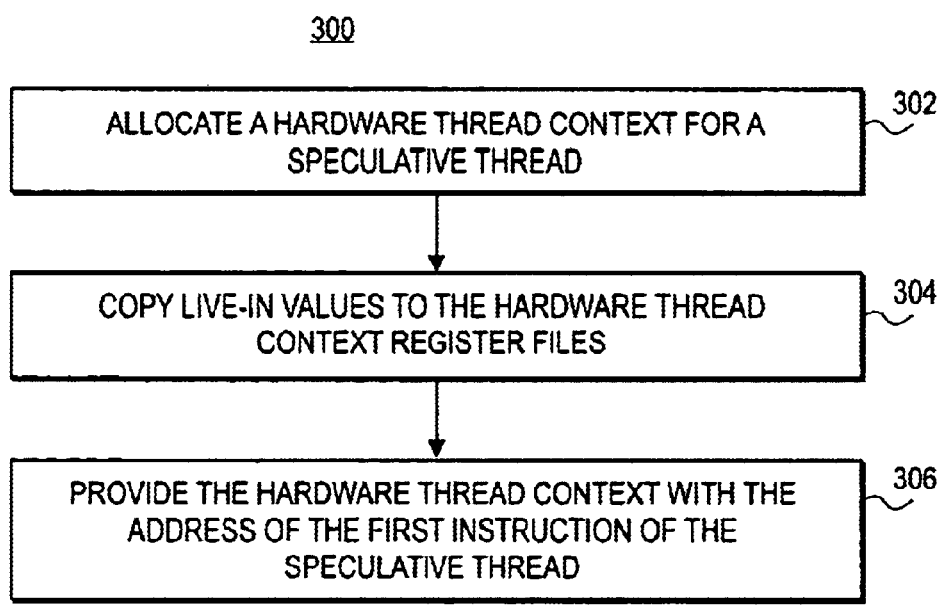
FIG. 3 is a flowchart illustrating an approach to spawning a speculative thread according to an embodiment of the present invention.

FIG. 3 is a flowchart 300 illustrating an approach to spawning a speculative thread in response to a spawn request according to an embodiment of the present invention. In step 302, a hardware thread context is allocated for a speculative thread. In step 304, the necessary live-in values for the speculative thread are copied to the hardware thread context's register file. Live in values include source operand values, which, for a given sequence of instructions, are passed to the sequence of instructions to perform a particular computation. Copying necessary live-in values into the hardware thread context's register files when a speculative thread is spawned minimizes the possibility of inter-thread hazards, such as where a register is overwritten in one thread before a speculative thread has read the register.

In step 306, the address of the first instruction of the speculative thread is provided to the hardware thread context. If a free hardware context is not available, then the spawn request is ignored.

When spawned, a speculative thread occupies a hardware thread context until the speculative thread completes execution of all instructions in the pre-computation slice. Speculative threads do not update the architectural state. In particular, "store" operations in a pre-computation slice do not update any memory state.

Figure 4:
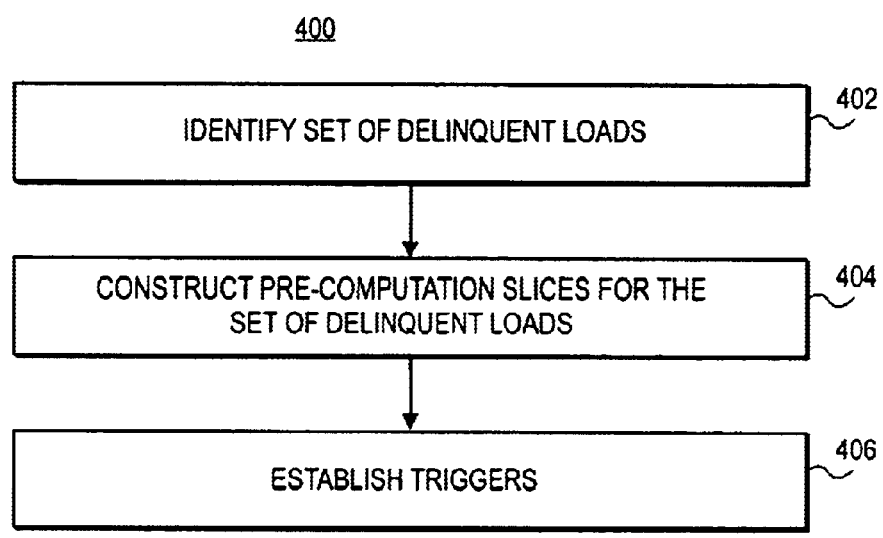
FIG. 4 is a flowchart illustrating an alternative approach to software-based pre-computation and multithreading according to an embodiment of the present invention.

FIG. 4 is a flowchart 400 illustrating an alternative approach to software-based pre-computation and multi-threading according to an embodiment of the present invention. The flow chart 400 may be performed offline, typically with compiler assistance. Alternatively, the flow chart 400 may be implemented partially or entirely in hardware.

In step 402 of the flowchart 400, a set of loads of interest is identified. In one embodiment, the loads are delinquent loads, which are static loads responsible for a vast majority of cache misses. The flow chart 200 may be applied to a delinquent load from the CPU2000 minimum cost network flow solver (mcf) benchmark. (CPU2000 is a software benchmark product produced by the Standard Performance Evaluation Corp. (SPEC), a nonprofit group in Warrenton, Va.) and is designed to provide performance measurements that can be used to compare compute-intensive workloads on different computer systems.

The set of delinquent loads that contribute the majority of cache misses is determined through memory access profiling, performed either by the compiler or a memory access simulator, such as "dinero," as described in Y. Kim, M. Hill, D. Wood, Implementing Stack Simulation for Highly-Associative Memories (extended abstract), *ACM Sigmetrics,* May 1991. From the profile analysis, the loads that have the largest impact on performance are selected as loads of interest. In one embodiment, the total number of L1 cache misses is used as a criterion to select loads of interest, but other filters (e.g., one that also accounts for L2 or L3 misses or total memory latency) could also be used.

In one embodiment, in step 404, pre-computation slices are constructed for the selected set of loads. Each benchmark may be simulated on a functional Itanium simulator to create the pre-computation slice for each load. In one embodiment of the present invention, the pre-computation slices are constructed with a window size of 128–256, which is smaller than those used in previous projects. A suitable example for constructing pre-computation slices is described in C. Zilles and G. Sohi. Understanding the Backward Slices of Performance Degrading Instructions, In *Proc. 27th International Symposium on Computer Architecture*, pages 172–181June 2000.

In step 406, triggers are established. Whenever a load is executed, the instruction that had been executed a predetermined number of instructions prior in the dynamic execution stream is marked as a potential basic trigger. For the next few times when this potential trigger is executed, the instruction stream is observed to see if the same load will be executed again somewhere within the next predetermined number of instructions. If this potential trigger consistently fails to lead to the load of interest, the potential trigger is discarded. Otherwise, if the trigger consistently leads to the load of interest, the trigger is confirmed and the backward slice of instructions from the load of interest to the trigger is captured.

Instructions between the trigger and the load of interest constitute potential instructions for constructing the pre-computation slice. By eliminating instructions that loads of interest do not depend on, the resulting pre-computation slices are typically of very small sizes, often on the order of only five to fifteen instructions per pre-computation slice.

To optimize basic triggers and pre-computation slices, many of the identified pre-computation slices can be removed. These include redundant triggers (multiple triggers targeting the same load), rarely executed triggers, and triggers that are too close to the target load. Additionally, generated pre-computation slices are modified to make use of induction unrolling.

For each benchmark, the instructions from each pre-computation slice are appended to the program binary in a special program text segment from which instructions for speculative threads are fetched at runtime. Steps may be taken to reduce potential instruction cache interference. Traditional code placement techniques similar to branch alignment may be employed to ensure, at compile time, that instructions from pre-computation slices do not cause the ported instruction cache 104 to conflict with the main code the pre-computation slices are trying to accelerate.

FIG. 5 illustrates the source code 500 for a key loop in an example mcf benchmark procedure, which contains three delinquent loads (502, 504, and 506). The three delinquent loads 502, 504, and 506 in the loop are annotated, and their cache-miss statistics 510 shown.

Figure 6:
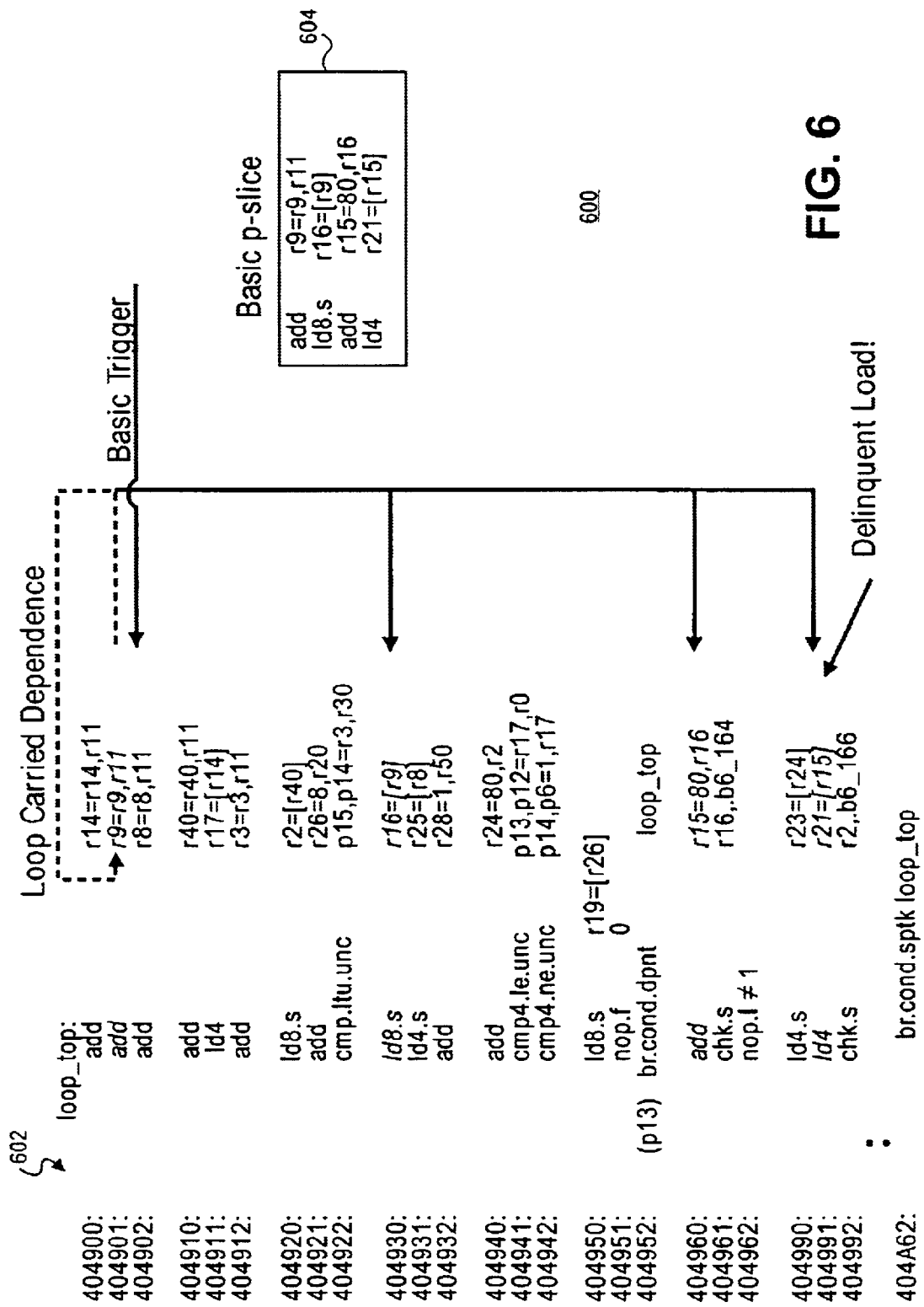
FIG. 6 depicts example assembly code for a basic triggered pre-computation slice for a sample load of interest.

FIG. 6 shows a partial assembly listing 602 and a pre-computation slice 604 captured from the example mcf benchmark procedure when applied to the delinquent load 506 depicted in FIG. 5. The pre-computation slice 604 targets an instance of the delinquent load 506 one loop iteration ahead of the main thread when the pre-computation slice 604 is spawned.

In some embodiments, the main thread is able to spawn speculative threads instantly without incurring any overhead cycles. In one embodiment,, speculative threads may be spawned from the main thread at the rename stage 108 by an instruction on the correct control flow path. Alternatively, speculative threads may be spawned at the commit stage (not shown) when the instruction is guaranteed to be on the correct path.

In other embodiments, the number of hardware thread contexts may be increased. If so, opportunities for more speculation to be performed at runtime results, which reduces cancellation of thread spawning due to unavailable thread contexts.

Speculative thread spawning may include on-chip memory buffers to bind a spawned thread to a free hardware context and a mechanism to transfer to the speculative thread the necessary set of live-in values from the main thread. Using on-chip memory buffers is advantageous because without flash-copy hardware one thread cannot directly access the registers of another thread, thus transfer of live-in values from a main thread to its speculative thread(s) has to be performed via an intermediate buffer to host temporarily spilled registers. These buffers typically occupy architecturally addressable regions of memory, and thus, are accessible from every thread context. A portion of this on-chip memory buffer space is allocated and dedicated it as an intermediate buffer for passing live-in values from a main thread to a speculative thread. This on-chip memory buffer space may be called a "live-in buffer" in embodiments in which the processor is an Itanium processor.

The live-in buffer is accessed through normal "loads" and "stores," which are conceptually similar to spilling and refilling values, across register files of different thread contexts. The main thread stores a sequence of values into the live-in buffer before spawning the speculative thread, and the speculative thread, right after binding to a hardware context, loads the live-in values from the live-in buffer into its context prior to executing the pre-computation slice instructions.

In one embodiment, the ability to spawn a speculative thread and bind it to a free hardware context also can be achieved via leveraging the lightweight exception-recovery mechanism, which is used to recover from incorrect control and data speculations. The lightweight exception-recovery mechanism uses speculation check instructions to examine the results of user-level control or data speculative calculations to determine success or failure. Should failure occur, an exception surfaces and a branch is taken to a user defined recovery handler code within the thread, without requiring operating system (OS) intervention.

For example, and In one embodiment, when an advanced load check (chk.a) instruction detects that some "store" conflicts with an earlier advanced "load," the advanced load check (chk.a) instruction triggers branching into a recovery code, within the current program binary, and executes a sequence of instructions to repair the exception. Afterwards, the control branches back to the instruction following the one that raised the exception. An available context check instruction (chk.c) raises an exception if a free hardware context is available for spawning a speculative thread. Otherwise, the available context check instruction (chk.c) behaves like a no operation (NOP) instruction, which causes the processor 100 to take no action for an instruction cycle.

The available context check instruction (chk.c) is placed in the code wherever a basic trigger is needed. The recovery code stores the live-in state to the live-in buffer, executes a spawn instruction to initiate the speculative thread, and then returns. The speculative thread begins execution by loading the values from the live-in buffer into its thread context. In this embodiment, spawning a thread is not instantaneous and slows down the main thread due to the need to invoke and execute the exception handler. In one embodiment, invoking the exception handler requires a pipeline flush. Moreover, pre-computation slices are modified to first "load" their live-in values from the live-in buffer, thus delaying the beginning of pre-computation.

Additional speculative threads can be spawned independent of progress on the main thread and to effectively pre-fetch data for delinquent loads is utilized to pre-compute pre-computation slices many loop iterations ahead of the main thread. Induction Unrolling, as described above, may be used for this purpose, but may increase the total number of speculative instructions executed without increasing the number of delinquent loads targeted. Executing more instructions puts extra pressure on the functional units 120 and occupies hardware thread contexts longer, thus increasing the number of basic triggers ignored because no hardware thread contexts are available.

In one embodiment, "chaining triggers" allow one speculative thread to explicitly spawn another speculative thread. To illustrate the use of chaining triggers, refer to the sample loop 500 from the mcf benchmark shown in FIG. 5. The three delinquent loads 502, 504, and 506 in this loop incur cache misses on almost every execution. The addresses used by the delinquent loads 504 and 506 are calculated from values in the same cache line as the value loaded by the delinquent load 502. Additionally, the stride in the addresses consumed by the delinquent load 502 is a dynamic invariant whose value is fixed for the duration of the loop.

There are hidden parallelisms that are not exploited by the basic trigger mechanism. For example, the next address fetched by the delinquent load 502 is calculated only by a single add (arc+=nr_group). Once the delinquent load 502 has completed, it takes only low latency operations to compute the addresses for the delinquent loads 504 and 506. Pre-fetching more than one loop iteration ahead of the main thread is necessary to cover the L2 cache miss latency for all these loads. The delinquent loads for multiple loop iterations can be pre-fetched in parallel.

Figure 7:
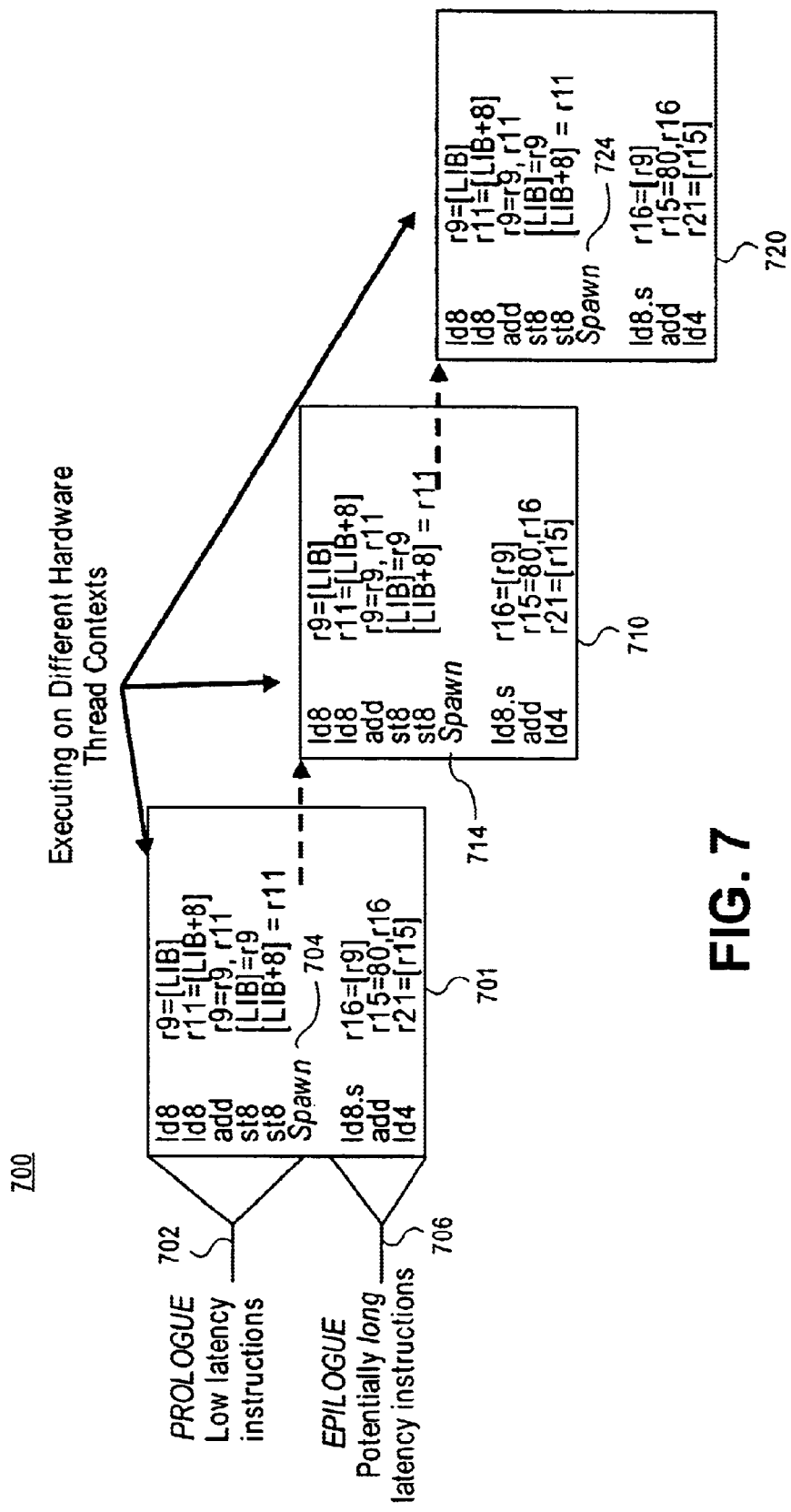
FIG. 7 depicts example assembly code for pre-computation slices chained triggered from the basic triggered pre-computation slice in FIG. 3.

FIG. 7 illustrates how the basic pre-computation slice from the sample loop in FIG. 5 behaves at runtime after being enhanced to incorporate chaining triggers. A pre-computation slice 701 includes a prologue 702, a spawn instruction 704, and an epilogue 706. Chaining triggers cause speculative threads to spawn additional speculative threads as soon as the pre-computation slice prologue 702 has been executed. If the prologue 702 can be executed quickly, speculative threads can be quickly spawned to populate all available hardware thread contexts.

The prologue 702 consists of instructions that compute values associated with a loop carried dependency, i.e., those values produced in one loop iteration and used in the next loop iteration, e.g., updates to a loop induction variable. The spawn instruction 704 spawns another copy of the pre-computation slice 701. The epilogue 706 includes instructions that produce the address for the targeted load of interest. The prologue 702 can be executed as quickly as possible, so that additional speculative threads can be spawned as quickly as possible.

In the embodiment shown in FIG. 7, when the pre-computation slice 701 encounters the spawn instruction 704, the pre-computation slice 710 is spawned. When the pre-computation slice 710 encounters the spawn instruction 714, the pre-computation slice 720 is spawned. When the pre-computation slice 720 encounters the spawn instruction 724, another pre-computation slice (not shown) is spawned.

Extremely aggressive pre-computation becomes possible because immediately after loop carried dependencies have been computed in a thread the chaining trigger can spawn another speculative thread, which leads to pre-computations for future loop iterations. In addition, because loop carried dependencies for this pre-computation slice 701 can be calculated significantly quicker than the main thread can advance through entire loop iterations, it is possible to pre-compute arbitrarily far ahead of the main thread.

When employing software-based speculative pre-computation, spawning speculative threads from chaining triggers is significantly cheaper, in terms of overhead, than that from basic triggers. A speculative thread, upon encountering a spawn instruction at a chaining trigger, does not raise an exception for spawning additional threads. Instead, the speculative thread can directly "store" values to the live-in buffer and spawn other speculative threads. Thus, chaining triggers allow speculative threads to be spawned without impacting the main thread. This means that the number of cycles required to spawn a speculative thread using a chaining trigger is bounded only by bandwidth to the live-in buffer. In this way, the main thread is not interrupted for threads spawned by a chaining trigger. Effectively, the more chaining triggers that are used, the fewer basic triggers may be used, resulting in less performance impact on the main thread.

Figure 8:
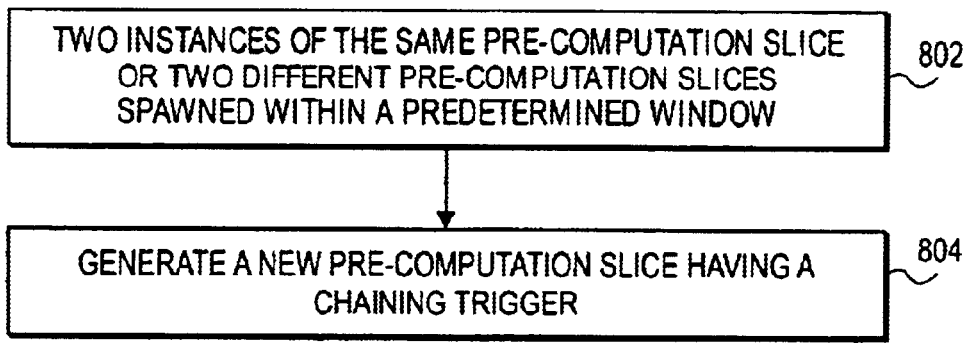
FIG. 8 shows an example process that may be used to add chaining triggers to basic pre-computation slices targeting delinquent loads within loops.

FIG. 8 shows an example process 800 that may be used to add chaining triggers to basic pre-computation slices targeting delinquent loads within loops. The process 800 is an augmented speculative pre-computation algorithm presented in the flow chart 400. In one embodiment, the process 800 tracks the distance between different instances of a load of interest. In step 802, it is determined that two instances of the same pre-computation slice or two instances of a two different pre-computation slices are consistently spawned within some fixed sized window of instructions. In step 804, a new pre-computation slice is created, which includes a chaining trigger that targets the same load of interest.

Figure 9:
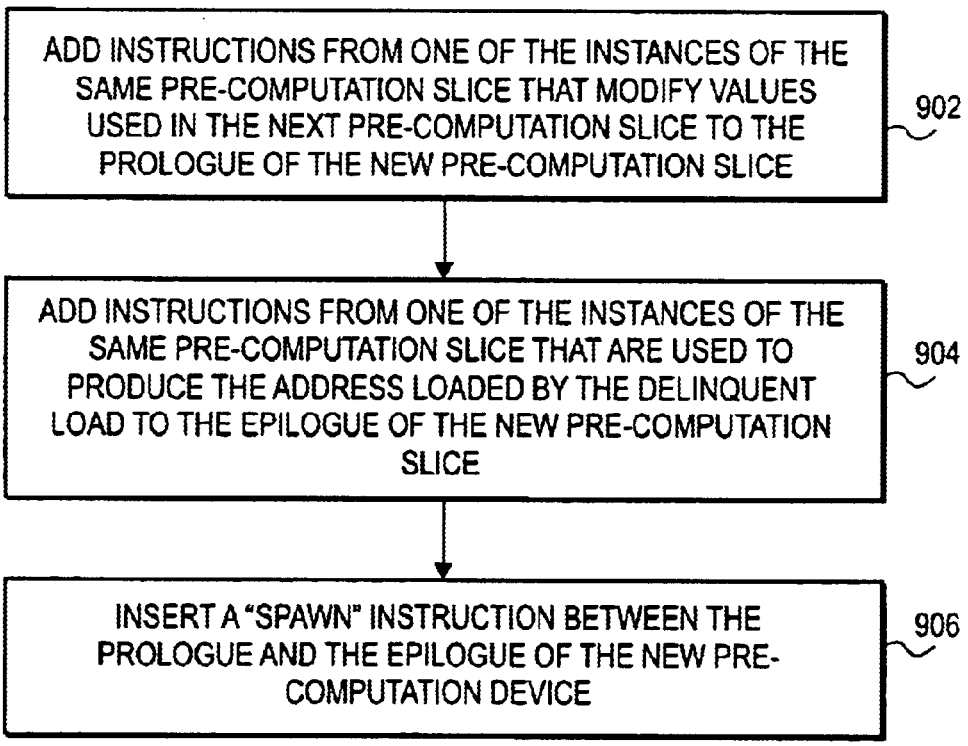
FIG. 9 shows an example process to generate a new pre-computation slice.

FIG. 9 shows an example process 900 to create a new pre-computation slice when it is determined that two instances of the same pre-computation slice are consistently spawned within some fixed sized window of instructions. In step 902, instructions from one pre-computation slice that modifies values used in the next pre-computation slice are added to the pre-computation slice prologue. In step 904, instructions to produce the address loaded by the load of interest are added to the pre-computation slice epilogue. In step 906, a spawn instruction is inserted between the pre-computation slice prologue and pre-computation slice epilogue to spawn another copy of the pre-computation slice.

Figure 10:
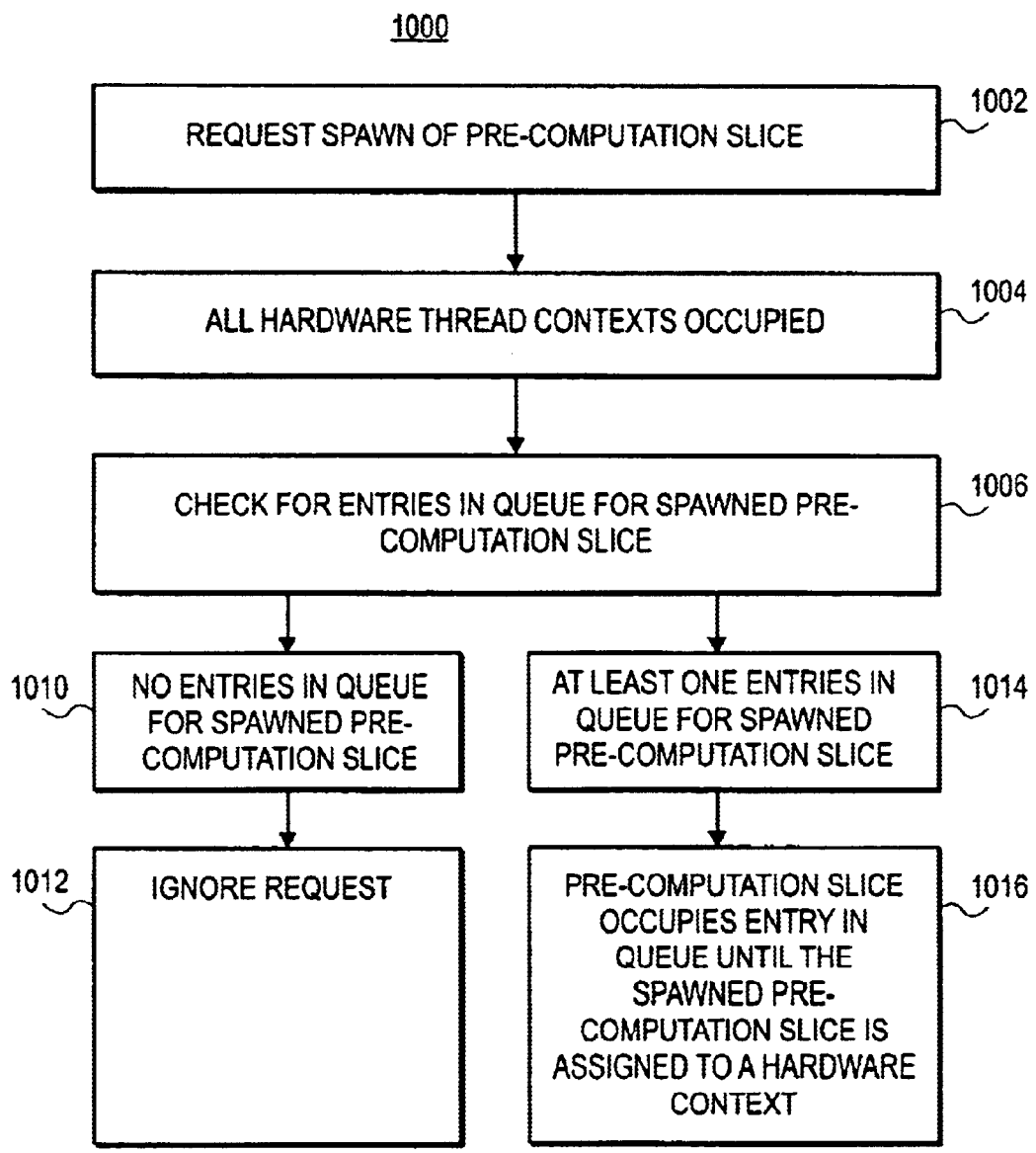
FIG. 10 illustrates an example process to enable the processor in FIG. 1 to have more speculative threads than hardware thread contexts.

For example, a hardware structure, called "Pending Slice Queue" (PSQ) (not shown), can be used to support more speculative threads in the processor 100 than the number of hardware thread contexts. FIG. 10 illustrates an example process 1000 suitable for enabling the processor 100 to have more speculative threads than hardware thread contexts.

In step 1002, a pre-computation slice is (requested to be) spawned. In step 1004, it is determined that all hardware thread contexts are occupied. In step 1006, the pre-computation slice is allocated an entry in the PSQ. The PSQ has access to the portion of the live-in buffer containing the live-in states that the spawning thread can store values. The PSQ is checked for entries.

In step 1008, it is determine that there are no available entries in the PSQ. In step 1010, the spawn request is ignored. If there is an entry in the PSQ for the pre-computation slice, as determined in step 1014, in step 1016, the pre-computation slice is placed in the PSQ entry. Once allocated, a PSQ entry remains occupied until the thread is assigned to a hardware context (1014). Threads from the PSQ are assigned hardware thread contexts according to a first-in-first-out (FIFO) policy. The sum of the total entries in the PSQ and the number of hardware contexts is the effective upper bound on the number of speculative threads that can exist at one time. The addition of the PSQ does not significantly increase the complexity of the processor 100.

In one embodiment, the size of the live-in-buffer is increased and logic to choose the next pending pre-computation slice to assign to a thread context is added. Increasing the live-in-buffer size can accommodate the condition when live-in-values are not consumed from the live-in-buffer immediately after being stored therein. However, the size of the live-in-buffer need not be excessively large. Copying the live-in values from the main thread to the live-in-buffer at spawn time ensures that the speculative thread will have valid live-in values to operate on when it eventually binds to a thread context regardless of how long it is forced to wait in the PSQ. In one embodiment, the number of register live-in values for pre-computation slices is sixteen. Chaining triggers enable speculative threads to spawn additional speculative threads, independent of progress made by the main thread. However, care must be taken to prevent overly aggressive speculative threads from evicting from the cache useful data that are used by the main thread. Additionally, once the main thread leaves the scope of a pre-computation slice, e.g., after exiting a pointer chasing loop or procedure, all speculative threads may be terminated to prevent useless pre-fetches.

To reduce the number of ineffective speculative threads a thread is terminated if it performs a memory access for which the hardware page table walker fails to find a valid translation, such as NULL pointer reference. Any chaining trigger executed afterwards in this pre-computation slice is treated as an NOP. This allows speculative threads to naturally "drain" out of the processor 100 (or other machine) without spawning additional useless speculative threads.

To eliminate speculative threads when the main thread leaves a section of the program, the processor 100 may add an additional basic trigger that is equivalent to a speculative thread flush, leading to termination for all currently executing speculative threads as well as clearing all entries in the PSQ. Such a speculative thread flushing trigger can be inserted upon exiting the scope in which the loads of interest are executed.

In an alternative embodiment, speculative threads are permitted to advance far enough ahead of the main thread until the speculative threads' pre-fetches cover up the latency to main memory, but no further. In this embodiment, the speculative threads cover memory latencies, but do not evict data out of the cache before being accessed by the main thread. For example, a hardware structure, called an "Outstanding Slice Counter" (OSC) (not shown), may be used to limit speculative threads to running only a fixed number (pre-computation slice specific) of loop iterations ahead of the main thread.

In one embodiment, the OSC tracks, for a subset of distinct loads of interest, the number speculative threads that have been spawned relative to the number of instances of the load(s) of interest that have not yet been retired by the main thread. Each entry in the OSC includes a counter, the instruction pointer (IP) of a load of interest, and the address of the first instruction in a pre-computation slice, which identifies which pre-computation slice corresponds to this OSC entry. The OSC is decremented when the main thread retires the corresponding load of interest, and is incremented when the corresponding pre-computation slice is spawned. When a speculative thread is spawned for which the entry in the OSC is on value (e.g., negative), the resulting speculative thread is forced to wait in the PSQ until the counter becomes a second value (e.g., positive), during which time the speculative thread is not considered for assignment to a hardware thread context. Entries in the OSC are manually allocated in the exception recovery code associated with some basic trigger. In one embodiment, the OSC is a four entry fully associative counter.

Aspects of the invention can be implemented using hardware, software, or a combination of hardware and software. Such implementations include state machines and application specific integrated circuits (ASICs). In implementations using software, the software may be stored on a machine-readable medium, e.g., a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    storing a main software thread in a first hardware context;
    binding a first speculative thread to a second hardware context and a second speculative thread to a third hardware context;
    dynamically invoking the first speculative thread using the main thread,
    dynamically invoking the second speculative thread using the first speculative thread;
    transferring live-in values from the first speculative thread to the first speculative thread;
    transferring live-in values from the first speculative thread to the second speculative thread;
    tracking for a set of loads of interest a number speculative threads that have been spawned relative to a number of instances of any load of interest that have not yet been retired by the main thread; and
    decrementing a counter when the main thread retires the corresponding load of interest.

2. The method of claim 1, further comprising raising an exception and branching to a recovery handler.

3. The method of claim 1, further comprising transferring live-in values for pre-computation slices to hardware thread context register files.

4. The method of claim 3, further comprising:
    allocating a portion of on-chip memory buffer space for the first and second speculative threads; and
    dedicating the allocated a portion of on-chip memory buffer space as an intermediate buffer to pass live-in values from the main thread to the first speculative thread and from the first speculative thread to the second speculative thread.

5. The method of claim 3, further comprising:
    identifying at least one load of interest;
    constructing pre-computation slices for each load of interest, wherein the pre-computation slice comprises a speculative thread that pre-computes an address accessed by a load of interest and pre-fetches for the load of interest using the pre-computed address; and
    establishing triggers to invoke the speculative thread.

6. The method of claim 5, wherein an individual speculative thread includes a pre-computation slice, the method further comprising:

allocating an entry in a queue for a copy of at least one pre-computation slice when it is determined that a hardware context is unavailable for the copy of the pre-computation slice; and placing the pre-computation slice in the queue until a hardware context is available.

7. The method of claim 1, further comprising:

detecting a trigger to invoke the second speculative thread;

storing second speculative thread live-in values to a buffer; and executing instructions in the second speculative thread.

8. The method of claim 1, further comprising transferring live-in values from flash-copy hardware or a portion of memory buffer space.

9. An apparatus comprising:

a processor having:
 a first hardware context to store a main thread;
 a second hardware context and a third hardware context to bind to a first speculative thread and a second speculative thread, respectively, the main thread to dynamically invoke the first speculative thread and the first speculative thread to dynamically invoke the second speculative thread;

a processor-readable medium having at least one processor-readable instruction stored thereon to instruct the processor to trigger the invocation of the first and second speculative threads;

logic coupled between the first, second, and third hardware contexts, and the processor-readable medium, the logic to bind the first and second speculative threads to the second and third hardware contexts, respectively, and to transfer live-in values from main thread to the first speculative thread and from the first speculative thread to the second speculative thread; and an outstanding pre-computation slice counter to track for a set of loads of interest the number speculative threads that have been spawned relative to the number of instances of any load of interest that have not yet been retired by the main thread and to decrement when the main thread retires the corresponding load of interest.

10. The processor of claim 9, further comprising a pending slice queue having entries to allocate a copy of at least one pre-computation slice when it is determined that a hardware context is unavailable for the copy of the pre-computation slice and to hold the pre-computation slice until a hardware context is available.

11. The processor of claim 9, wherein the outstanding pre-computation slice counter is further to increment when the corresponding pre-computation slice is spawned, and to force any speculative thread for which the entry in the counter is in a predetermined state to wait in the queue until the entry in the counter becomes a second predetermined state.

12. A machine-readable medium having machine-readable instructions stored thereon to instruct a processor to:

storing a main software thread in a first hardware context;

binding a first speculative thread to a second hardware context and a second speculative thread to a third hardware context;

dynamically invoke the first speculative thread using the main thread;

dynamically invoking the second speculative thread using the first speculative thread;

transferring live-in values from the main thread to the first speculative thread;

transferring live-in values from the first speculative thread to the second speculative thread;

tracking for a set of loads of interest a number speculative threads that have been spawned relative to a number of instances of any load of interest that have not yet been retired by the main thread; and decrementing a counter when the main thread retires the corresponding load of interest.

13. The machine-readable medium of claim 12 wherein the instructions are further to instruct the processor to:

allocate an entry in a queue for a copy of at least one pre-computation slice when it is determined that a hardware context is unavailable for the copy of the pre-computation slice; and place the pre-computation slice in the queue until a hardware context is available.

14. The machine-readable medium of claim 12 wherein the instructions are further to instruct the processor to:

identify a set of loads of interest;

construct pre-computation slices for each delinquent load of interest, wherein the pre-computation slice comprises a speculative thread that pre-computes an address accessed by a load of interest; and establish triggers to invoke the speculative thread.

15. The machine-readable medium of claim 14 wherein the instructions are further to instruct the processor to:

allocate an entry in a queue for a copy of at least one pre-computation slice when it is determined that a hardware context is unavailable for the copy of the pre-computation slice; and place the pre-computation slice in the queue until a hardware context is available.

16. The machine-readable medium of claim 15 wherein the instructions are further to instruct the processor to:

increment a counter when the corresponding pre-computation slice is spawned; and forcing any speculative thread for which the entry in the counter is in a predetermined state to wait in the queue until the entry in the counter becomes a second predetermined state.

* * * * *

UNITED STATES PATENT AND TRADEMARK OFFICE
CERTIFICATE OF CORRECTION

PATENT NO. : 6,928,645 B2
DATED : August 9, 2005
INVENTOR(S) : Wang et al.

It is certified that error appears in the above-identified patent and that said Letters Patent is hereby corrected as shown below:

Column 1,
Line 12, delete "modem" and insert -- modern --.

Column 12,
Line 36, delete "first speculative" and insert -- main --.

Signed and Sealed this

First Day of November, 2005

JON W. DUDAS
*Director of the United States Patent and Trademark Office*